United States Patent [19]

Henriksen

[11] 4,306,003
[45] Dec. 15, 1981

[54] ZINC HALOGEN BATTERY ELECTROLYTE COMPOSITION WITH LEAD ADDITIVE

[75] Inventor: Gary L. Henriksen, Troy, Mich.

[73] Assignee: Energy Development Associates, Inc., Madison Heights, Mich.

[21] Appl. No.: 134,930

[22] Filed: Mar. 28, 1980

[51] Int. Cl.³ ............................................ H01M 10/36
[52] U.S. Cl. ..................................... 429/101; 429/199
[58] Field of Search ................................. 429/101, 199

[56] References Cited

U.S. PATENT DOCUMENTS

| | | | |
|---|---|---|---|
| 4,029,854 | 6/1977 | Walsh et al. | 429/101 |
| 4,091,152 | 5/1978 | Rao et al. | 429/101 |
| 4,181,777 | 1/1980 | Spaziante et al. | 429/50 |

Primary Examiner—Donald L. Walton
Attorney, Agent, or Firm—Harness, Dickey & Pierce

[57] ABSTRACT

This disclosure relates to a zinc halogen battery electrolyte composition containing an additive providing improved zinc-on-zinc recyclability. The improved electrolyte composition involves the use of a lead additive to inhibit undesirable irregular plating and reduce nodular or dendritic growth on the electrode surface. The lead-containing electrolyte composition of the present invention appears to influence not only the morphology of the base plate zinc, but also the morphology of the zinc-on-zinc replate. In addition, such lead-containing electrolyte compositions appear to reduce hydrogen formation.

4 Claims, No Drawings

ZINC HALOGEN BATTERY ELECTROLYTE COMPOSITION WITH LEAD ADDITIVE

BACKGROUND OF THE INVENTION

In its broad aspects, the present invention is directed to secondary electrical energy storage systems of the aqueous type which utilize a metal electrode such as zinc which in combination with a reducing agent undergoes an electrochemical reaction in a cell to produce an electrical current. A metal halogen hydrate electrical energy storage system of the type to which the present invention is applicable is fully described in U.S. Pat. No. 3,713,888, entitled "Halogen Hydrates", issued Jan. 30, 1973. This patent is owned by the same assignee as the present invention and details thereof beyond those herein described are incorporated in this application by reference. Metal halogen hydrte electrical energy storage systems or secondary storage batteries are conveninetly categorized as being of the high energy density (H.E.D.) type because of their capacity to supply upwards of 50 watt hours of electric power per pound of weight. This high electrical energy capacity coupled with the compactness and low weight of such secondary storage batteries has rendered them particularly satisfactory for use as principal and auxiliary sources of electrical energy in either mobile (electric vehicles) or stationary (utility load leveling) power plant systems.

The present invention pertains primarily to zinc halogen battery systems, and more prticularly to zinc chlorine battery systems, although it should be appreciated that the invention described herein may be equally applicable to other metal halogen battery systems. The chemical reactions which occur in a zinc chlorine hydrate battery are relatively straightforward. During charge, the electrolyte (a solution of zinc chloride in water) is flowed through the battery with the aid of a circulator. As electrical direct current is passed through the battery from an external source, zinc metal is electro-deposited on the zinc electrode (typically relatively dense graphite) of the battery as a uniform, non-porous solid. Simultaneously, chlorine gas, generated at the chlorine electrode (typically porous graphite or ruthenia-catalyzed porous titanium) is carried away with the circulating electrolyte stream. Outside of the battery, the mixture of chlorine gas and electrolyte is cooled and a pale yellow solid called chlorine hydrate is formed. The solid chlorine hydrate ($Cl_2 \cdot xH_2O$) is retained separate from the battery, and the remaining electrolyte is returned.

During discharge, the aqueous zinc chloride electrolyte is again circulated through the battery thereby carrying chlorine, which is slightly soluble in the electrolyte, to the chlorine electrode of the battery. Zinc metal reacts at the zinc electrode to form zinc ions, and chlorine reacts at the chlorine electrode to form chloride ions. As the battery is discharged, chlorine is returned to the electrolyte from the storage area by controlled heating of the chlorine hydrate. These processes continue until the chlorine-hydrate in the store is dissipated and the battery is discharged.

For some applications, such as vehicular use, the discharge is often a partial discharge, which poses special problems as compared to a complete discharge. Test results on zinc chlorine batteries, and more particularly on the zinc electrode in such batteries have, in general, shown unacceptable zinc-on-zinc recyclability. It should be recalled that the zinc electrode, typically made from relatively dense graphite, provides a surface for the electron transfer reactions in charge and discharge between metallic zinc and zinc ions. Zinc-on-zinc recyclability refers to the ability of the negative battery electrode (the zinc electrode) to accept a recharge after partial discharge, which in effect means the ability of the electrode to accept a fresh zinc plate on top of an older zinc plate, the older plate having been partially dissolved in the preceding discharge. In the case of partial discharge, zinc is oxidized off the electrode, but very often in a somewhat irregular manner, thus leaving a poor surface layer for subsequent deposition or replating of zinc during charge. As a result, the newly deposited zinc forms a dendritic or nodular structure, which may lead to internal short-circuiting of the battery.

One solution which has been proposed to the problem of dendrite formation is the use of additives in the electrolyte solution; however, this additive approach has not met with total success. Organic additives such as those used in typical zinc plating baths, are usually oxidized or decomposed by the oxidizing agents in most rechargeable batteries. Also, by various mechanisms they may interfere with the reversibility of either electrode. It has also been found that some additives tend to precipitate or salt out during repeated recharging; examples of such additives being benzotriazole, benzene sulfonamide, toluene sulfonamide, chlorotoluene sulfonamide and thiourea. Lastly, attempts at using certain organic additives, such as those described in U.S. Pat. No. 3,793,079 and U.S. Pat. No. 3,811,946 both owned by the assignee of the present invention, although effective, have not met with total success in all cases, since they sometimes tend to degrade over extended periods.

The chemical instability of many organic additives in metal halogen battery systems may in some circumstances be circumvented by using stable inorganic additives. One such inorganic additive, thallium, while providing some leveling for the initial charging process, is generally unacceptable for cycling zinc on zinc due to morphological changes encountered on partial discharges. This is due in part to the fact that the additive, which codeposits with zinc during the charge so as to be distributed throughout the plate, is held at the electrode surface on discharge, when the zinc is oxidized, by virtue of the highly reducing conditions existing at the electrode surface. The remaining surface layer provides poor deposition sites for the replating of zinc, thereby causing the newly deposited zinc to form a dendritic or nodular structure. In the past, when good zinc-on-zinc recyclability was desired, zinc chloride without such an additive would be used and cell conditions would be carefully chosen to achieve the desired capacity and recyclability. However, the absence of an additive results in a granular zinc deposit making the system somewhat less forgiving in respect to variations in contaminant levels and operating conditions. On this basis, an additive that has no adverse effect on recyclability would be desirable.

The improved electrolyte composition comprising the present invention overcomes the foregoing problems by enabling a recharging of zinc halogen batteries at a rate practical for normal use and wherein the metal is redeposited during the recharging process in the form of a substantially smooth, dense, and adherent metallic deposit. Thus the partial discharge-recharge characteristics of the battery are substantially improved.

SUMMARY OF THE INVENTION

The benefits and advantages of the present invention are achieved by employing a novel electrolyte composition in an electrical storage device or battery having an electrode area containing at least one positive and at least one negative electrode. In addition, a storage area may be provided for a halogen hydrate which is disposed in communication with the electrode area. The electrolyte composition comprises an aqueous solution containing a metal halide in which the metallic constituent comprises a metal such as zinc, and the halide constituent comprises a halogen such as chlorine or bromine, as well as mixtures thereof. The metal halide concentration may range from a concentration of about 0.1 percent up to a concentration approaching a saturation of the electrolyte. In addition, the electrolyte contains an additive, lead, which is soluble in the electrolyte and is present in an amount broadly ranging from about 10 ppm (parts per million) to about 25 ppm, and preferably at about 15 to 17 ppm. The lead is soluble in the electrolyte solution under the operating conditions encountered and does not adversely affect the structural components of which the battery is comprised. Lead may be added to the electrolyte solution as normal analytical reagent grade lead chloride ($PbCl_2$). This electrolyte composition is believed to be particularly satisfactory for use in mobile power plant systems such as in electric vehicles.

Additional benefits and advantages of the present invention will become apparent upon a reading of the description of the preferred embodiments, taken in conjunction with the specific examples.

DESCRIPTION OF THE PREFERRED EMBODIMENTS

It will be understood that the concentrations of the several ingredients in the electrolyte as herein described and set forth in the subjoined claims are expressed in terms of percentages by weight, unless expressly indicated otherwise.

The electrolyte broadly comprises a solution containing a dissolved metal halide, lead, and dissolved and/or entrained halogen gas formed during the charging of the battery. On discharge, the electrolyte may contain halogen hydrate or more usually the decomposition products of halogen hydrate, i.e., halogen and water. In the more usual and preferred form, the electrolyte consists essentially of an aqueous solution containing from about 0.1 percent up to a saturated concentration of a zinc halide solution. In addition to the foregoing, other ingredients can be included for providing further controlled variations and changes in the physical and chemical properties of the electrolyte, such as variations in the ionic conductivity of the electrolyte, etc. The preferred halogen constituents are chlorine and bromine, of which the chloride salts of the preferred metals are particularly suitable and constitute the preferred embodiment. Particularly satisfactory results are obtained employing aqueous solutions containing zinc chloride as the metal halide in combination with effective dendrite reducing amounts of lead which may be added to the electrolyte solution as lead chloride ($PbCl_2$).

Generally, zinc halide concentrations of about 5 percent to saturation are used, while concentrations of about 5 percent up to about 50 percent by weight are preferred. Generally, when zinc chloride is employed as the metal halide, concentrations ranging from about 5 percent to about 35 percent are preferred.

The electrochemical reactions occurring during discharge of the storage battery are typified by the following equations:

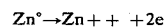

$Zn° \rightarrow Zn^{++} + 2e$

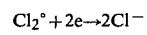

$Cl_2° + 2e \rightarrow 2Cl^-$

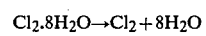

$Cl_2 \cdot 8H_2O \rightarrow Cl_2 + 8H_2O$

The foregoing equations are for a storage battery in which the oxidizable metal is zinc, the halogen is chlorine and the hydrate is chlorine hydrate which progressively decomposes to supply additional chlorine in the aqueous electrolyte to replenish that which is reduced at the positive electrode and enters the electrolyte in the form of a chloride ion along with the oxidized zinc metal ion. Since water is added to the electrolyte as the result of the progressive decomposition of the halogen hydrate, the concentration of the metal halide salt in the electrolyte remains reasonably constant throughout the discharge phase of the storage battery.

In order to further illustrate the invention, the following examples are provided. It is to be understood, however, that the examples are included for illustrative purposes and are not intended to be limiting of the scope of the invention as set forth in the subjoined claims.

EXAMPLES

Using a 50 wH (watthour) test cell containing about 260 $cm^2$ of electrode area, operated at intermediate duty cycles (to 65–70% discharge depth), several tests were conducted to qualify the use of lead as an effective additive to the electrolyte. Electrolyte having lead concentration levels of 25 ppm, 17 ppm, 15 ppm, 10 ppm, and essentially, 0 ppm (<20 ppb) was utilized during the tests to evaluate the effect of Pb concentration on zinc plate density and leveling during zinc-on-zinc duty cycling. Subsequent to complete recharge, the zinc plates were removed from the graphite electrodes and examined.

The electrolyte used in the tests comprised about 25% by weight zinc chloride plus the various tested concentrations of lead, added as lead chloride. The solution had a specific gravity of about 1.24 at 25° C. A small quantity (or about 150 millimoles/liter) of hydrochloric acid (HCl) was also added to adjust the pH of the solution to an acceptable range of about 0.1 to about 0.2.

With regard to the preparation of the electrolyte, a 50–60% (by weight) zinc chloride aqueous solution, prepared by the reaction of chlorine with high purity (99.9+%) zinc metal in an aqueous medium, was diluted with distilled water to the proper specific gravity. A small quantity of concentrated analytical grade HCl was then added to adjust the solution pH to the 0.1–0.2 range. Into a known volume of this solution the desired quantity of lead (Pb) was added in the form of (dried) analytical grade lead chloride ($PbCl_2$). The weight of lead chloride (W, in grams) can be calculated using the relationship:

$$W = \frac{C\,Vp(M_2/M_1)(10^{-6})}{[1 - C(M_2/M_1)(10^{-6})]} \simeq C\,Vp(M_2/M_1)(10^{-6})$$

In the above equation, C is the desired concentration of lead (Pb) in ppm, V is the volume of solution in liters, $\rho$ is the density of the solution in grams/liter, $M_2$ is the molecular weight of lead chloride ($PbCl_2$), and $M_1$ is the atomic weight of lead (Pb). Raising the temperature of the solution and bubbling chlorine through the solution while stirring will enhance the dissolution of the lead chloride salt.

During the tests, the following operating conditions were used:

Charge Conditions

Current density of 30 mA/cm$^2$ (total current of 7.8 amperes)

Electrolyte flow rate of 1.9-2.3 ml/cm$^2$-min (total flow of 490-600 ml/min)

Temperature of 24°-27° C.

$Cl_2$ concentration of about 1 gram/liter

Discharge Conditions

Current density of 40 mA/cm$^2$ (total current of 10.4 amperes)

Electrolyte flow rate of 1.9-2.3 ml/cm$^2$-min (total flow of 490-600 ml/min)

Temperature of 25°-30° C.

$Cl_2$ concentration of about 2 grams/liter

The test cell was cycled, using an initial electrolyte volume of 700 ml, through three partial discharge-recharge cycles. Total charge time varied between about 4 to 8 hours for the various tests. Other operating conditions, parameters, relationships or the like are believed to be well within the expertise of one skilled in this art.

At the 25 ppm lead concentration level, second cycle zinc plates demonstrated stratification with poor adhesion between the initial zinc plate layer and the replate layer. The initial zinc plate layer was very dense while the replate layer was considerably less dense tending toward uniform dendrite formation. During the shallow discharge, the zinc surface, very likely, became lead enriched as the zinc was preferentially dissolved anodically. During recharge, the higher purity zinc replate formed a poorly adherent deposit.

At the 17 ppm lead concentration level, zinc plate of 40X magnification gave a smooth, dense morphology.

At the 15 ppm lead concentration level, second cycle zinc deposits were uniform and dense and resembled the very dense zinc plates obtained during the initial charge in tests performed with the electrolyte containing 17 ppm Pb.

At the 10 ppm lead concentration level, second cycle zinc plates also demonstrated some stratification with a dense base layer and coarse granular replate layer. As in the case of a lead free electrolyte, the second cycle zinc plate was free of stratification, but exhibited a porous, less dense zinc structure.

At a lead concentration level of <200 ppb (parts per billion), zinc plate at 40X magnification gave a rough coarse morphology tending toward nodular type dendrite formation.

The above tests indicate that at the 15 ppm lead level in the starting electrolyte, a dense zinc plate was obtained. On subsequent partial discharge and then recharge cycles, a dense coherent zinc was redeposited. At the 25 ppm lead level, although the initial and subsequent replates resulted in dense zinc, significant delamination occurred between the old and new layers. At the 10 ppm lead level the initial plate was dense, but the replate, after partial discharge, was granular and exhibited some delamination. Base data, without lead additive, resulted in the typical granular low density deposit for the initial and replated zinc with no delamination of the layers.

Lead appears particularly attractive from several points of view. The quantity needed to produce a rather dramatic improvement in zinc plate morphology is quite low (about 15 ppm). In appropriate concentration, lead appears to influence not only the morphology of the base plate zinc, but also the morphology of the zinc-on-zinc replate. In addition, indications are that lead diminishes $H_2$ evolution in the zinc-chlorine cells.

The lead additive of the present invention can be satisfactorily employed in accordance with the foregoing definitions and is soluble in the electrolyte in the specific concentrations required over the temperature range normally encountered during that specific battery use. In addition to the foregoing characteristics, lead additive is substantially stable during battery operation to avoid a rapid depletion thereof to levels below that normally required to attain the benefits of the present invention, and preferably to avoid the necessity of frequently or continuously replenishing the additive during the battery charging operation. Also, the lead additive does not degrade as do many organic additives. In addition to the above advantages, lead, is compatible with the chemical composition of the electrolyte, as well as with the materials of which the battery system is composed.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. An electrolyte composition for use in a zinc chlorine battery construction having at least one positive electrode and at least one negative electrode, said electrolyte composition comprising an aqueous zinc chloride solution and lead as an additive to said electrolyte in an amount between 10 and 25 parts per million which is effective to both reduce dendrite formation on said negative electrode during recharging after a partial discharge and provide an adherent zinc plate layer during said recharging.

2. The invention of claim 1 wherein said lead is present in said electrolyte in an amount from about 15 to about 17 parts per million.

3. The invention of claim 1 wherein said lead is present in said electrolyte in an amount of about 15 parts per million.

4. An improved zinc chlorine battery construction comprising at least one positive electrode and at least one negative electrode and the electrolyte composition of claim 1.

* * * * *

UNITED STATES PATENT AND TRADEMARK OFFICE
CERTIFICATE OF CORRECTION

PATENT NO. : 4,306,003
DATED : December 15, 1981
INVENTOR(S) : Gary L. Henriksen It is certified that error appears in the above—identified patent and that said Letters Patent is hereby corrected as shown below:

Column 1, line 18, "hydrte" should read -- hydrate --.

Column 1, line 20, "netly" should resd -- ently --.

Column 1, line 30, "prticularly" should read -- particularly --.

Signed and Sealed this

Twenty-fifth Day of May 1982

[SEAL]

*Attest:*

*Attesting Officer*

GERALD J. MOSSINGHOFF
*Commissioner of Patents and Trademarks*

UNITED STATES PATENT AND TRADEMARK OFFICE
CERTIFICATE OF CORRECTION

PATENT NO. : 4,306,003
DATED : December 15, 1981
INVENTOR(S) : Gary L. Henriksen It is certified that error appears in the above-identified patent and that said Letters Patent is hereby corrected as shown below:

Insert as the first paragraph of application after the title:

--The Government of the United States of America has rights in this invention pursuant to Contract No. DE-AC02-76ET20121 awarded by the U.S. Department of Energy.--

Signed and Sealed this

Fifteenth Day of October 1985

[SEAL]

Attest:

Attesting Officer

DONALD J. QUIGG

Commissioner of Patents and Trademarks—Designate